United States Patent
Yoshida et al.

(10) Patent No.: US 12,450,022 B2
(45) Date of Patent: Oct. 21, 2025

(54) INFORMATION PROCESSING DEVICE, CONTROL METHOD OF INFORMATION PROCESSING DEVICE, PROGRAM, AND RECORDING MEDIUM

(71) Applicant: Sony Interactive Entertainment Inc., Tokyo (JP)

(72) Inventors: Koichi Yoshida, Tokyo (JP); Sachiyo Aoki, Tokyo (JP); Yasunari Hatasawa, Tokyo (JP); Takahiro Aizawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/730,793

(22) PCT Filed: Jan. 19, 2023

(86) PCT No.: PCT/JP2023/001586
§ 371 (c)(1),
(2) Date: Jul. 22, 2024

(87) PCT Pub. No.: WO2023/145616
PCT Pub. Date: Aug. 3, 2023

(65) Prior Publication Data
US 2025/0103263 A1  Mar. 27, 2025

(30) Foreign Application Priority Data
Jan. 31, 2022 (JP) .................. 2022-013442

(51) Int. Cl.
*G09G 5/00* (2006.01)
*G06F 3/14* (2006.01)

(52) U.S. Cl.
CPC .................... *G06F 3/14* (2013.01)

(58) Field of Classification Search
CPC ........ G09G 5/393; G09G 5/363; G09G 5/005; G09G 3/22; G09G 2360/121;
(Continued)

(56) References Cited

U.S. PATENT DOCUMENTS 8,542,221 B1    9/2013  Wyatt et al.
12,164,358 B2 * 12/2024  Nidamanuri .......... G06F 1/3218
(Continued)

FOREIGN PATENT DOCUMENTS

CN      111131622 A    5/2020
JP      H11-231854 A   8/1999
(Continued)

OTHER PUBLICATIONS

International Search Report and Written Opinion mailed on Apr. 4, 2023, received for PCT Application PCT/JP2023/001586, filed on Jan. 19, 2023, 9 pages including English Translation.

*Primary Examiner* — Jennifer T Nguyen
(74) *Attorney, Agent, or Firm* — Fish & Richardson P.C.

(57) ABSTRACT

There is provided an information processing device that accepts an input of an emulation setting relating to a function of a display monitor as a target of emulation and executes a display output of an image rendered by executing an application program to a display monitor actually connected, in such a manner as to emulate a state in which a display monitor with a function represented by the accepted emulation setting is virtually connected.

18 Claims, 3 Drawing Sheets

(58) Field of Classification Search
CPC .............. G09G 2360/08; G09G 5/001; G09G 2360/125; G09G 2360/02; G01C 21/32; G06F 9/30043; G06F 3/0412; G06F 3/14; H03K 19/17724
USPC ........................................................ 345/156
See application file for complete search history.

(56) References Cited

U.S. PATENT DOCUMENTS

| | | |
|---|---|---|
| 2015/0109286 A1 | 4/2015 | Verbeure et al. |
| 2016/0092010 A1 | 3/2016 | Agarwal et al. |
| 2019/0172388 A1* | 6/2019 | Saini ....................... G09G 5/393 |
| 2021/0065658 A1* | 3/2021 | Ji ............................ G09G 5/18 |
| 2022/0051630 A1 | 2/2022 | Shen et al. |
| 2025/0104597 A1 | 3/2025 | Aizawa et al. |
| 2025/0161807 A1 | 5/2025 | Tokunaga et al. |

FOREIGN PATENT DOCUMENTS

| | | |
|---|---|---|
| JP | 2002-223380 A | 8/2002 |
| JP | 2016-529534 A | 9/2016 |
| JP | 2020-058710 A | 4/2020 |
| JP | 2021-135309 A | 9/2021 |
| WO | WO 2015037316 A1 | 3/2015 |
| WO | WO 2016076059 A1 | 5/2016 |

* cited by examiner

○ FIXED REFRESH RATE _____Hz

◉ VARIABLE REFRESH RATE

LOWER-LIMIT VALUE  [ 48Hz ▽ ]

UPPER-LIMIT VALUE  [ 144Hz ▽ ]
60Hz
80Hz
100Hz
⋮

☑ LIMIT IS IMPOSED ON VARIATION IN REFRESH RATE

INFORMATION PROCESSING DEVICE, CONTROL METHOD OF INFORMATION PROCESSING DEVICE, PROGRAM, AND RECORDING MEDIUM

CROSS-REFERENCE TO RELATED APPLICATIONS

The present application is based on PCT filing PCT/JP2023/001586, filed Jan. 19, 2023, which claims priority from Japanese Patent Application No. 2022-013442, filed Jan. 31, 2022, the entire contents of each are incorporated herein by reference.

TECHNICAL FIELD

The present invention relates to an information processing device such as a home-use game console, a control method thereof, a program executed by the information processing device, and a recording medium that stores the program.

BACKGROUND ART

In recent years, there are display monitors having various functions. Examples of the display monitor include a display monitor compatible with what is generally called a variable refresh rate, that is, dynamically changing the refresh rate in such a manner as to flexibly respond to difference in the rendering time for each frame in order to allow motion of a rendered image to be smooth, a display monitor that is not compatible with the variable refresh rate, and a display monitor that is compatible with the variable refresh rate but involves a limit on change in the refresh rate.

Thus, a system program (operating system or the like) of an information processing device executes processing according to the display monitor with various functions.

For this reason, even in a case in which use of, for example, the variable refresh rate is demanded from an application program, the system program side possibly makes a response indicating that accepting this use is impossible.

SUMMARY

Technical Problems

Under such a situation, ideally, it is preferable for a developer of an application program executed in an information processing device to sequentially connect display monitors having various functions different from each other to the information processing device and execute the application program to investigate whether the application program properly deals with a response from a system program and execute debugging.

However, as described above, there is a wide variety of difference in the functions of the display monitor, and it is not practical to test all of the functions.

Further, it is also conceivable that it will become difficult to obtain display monitors having comparatively old specifications, and it is possibly difficult in some cases to connect such a display monitor for a test.

The present invention has been made in view of the above-described circumstances, and one of objects thereof is to provide an information processing device, a control method of an information processing device, a program, and a recording medium that enable emulation of an operation of a case in which a display monitor with various functions is connected.

Solution to Problems

One aspect of the present invention to solve the above-described problem of the conventional example is an information processing device. The information processing device includes a setting accepting section that accepts an input of an emulation setting relating to a function of a display monitor as a target of emulation, an execution managing section that manages execution of an application program, and a display control section that executes a display output of an image rendered by executing the application program to a display monitor actually connected, in such a manner as to emulate a state in which a display monitor with a function represented by the accepted emulation setting is virtually connected.

Advantageous Effect of Invention

According to the information processing device of this example, an operation of the case in which it is assumed that a display monitor with various functions is connected can be emulated.

DESCRIPTION OF EMBODIMENT

An embodiment of the present invention will be described with reference to the drawings. An information processing device 1 according to one example of the embodiment of the present invention is, for example, a home-use game console or the like and is connected to a display monitor 2 and used.

Figure 1:
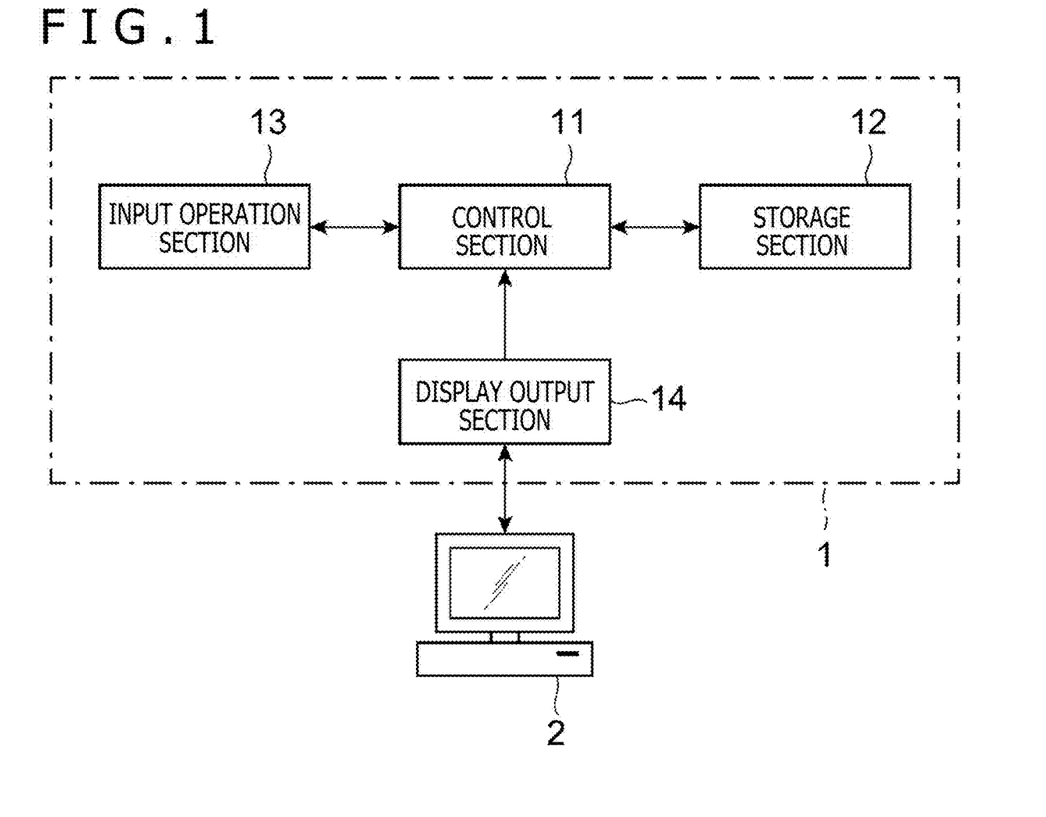
FIG. 1 is a block diagram representing a configuration example of an information processing device according to an embodiment of the present invention.

As exemplified in FIG. 1, the information processing device 1 includes a control section 11, a storage section 12, an operation section 13, and a display output section 14. This information processing device 1 may include a network interface and the like besides these configurations.

The control section 11 is a program control device (at least one processor) such as a central processing unit (CPU) and, in an example of the present embodiment, executes processing according to a system program and an application program stored in the storage section 12.

The system program is for managing activation, end, and the like of the application program. The control section 11 executes processing of activation, end, and the like of the application program according to this system program. Further, during execution of the application program, the control section 11 controls the display monitor 2 in response to a demand based on processing of the application program and executes also processing of input and output, such as an output of a signal of video based on each frame rendered by the application program.

The application program is, for example, a program of a game application, and receives an operation input by a user, to execute processing of a game or the like. A setting regarding use of the variable refresh rate of a display monitor may be executed in advance in association with this application program. Moreover, the control section 11 repeatedly executes processing of rendering a screen (frame) by following this application program.

In the present embodiment, the control section 11 emulates functions of a display monitor as an operation of the system program. That is, at the time of execution of the application program, the control section 11 emulates a state in which a display monitor with a function represented by the emulation setting input in advance is virtually connected.

As one example, even when the display monitor 2 connected to the information processing device 1 of the present embodiment has no limit on the rate of variation in the variable refresh rate between frames, for example, the information processing device 1 emulates the behavior (response to the application program) of a display monitor with a limit on the rate of variation in the variable refresh rate between frames. Further, even if the variable range of the variable refresh rate of the display monitor 2 actually connected to the information processing device 1 is 1 to 200 Hz, the information processing device 1 emulates the behavior of, for example, a display monitor in which the variable range is 1 to 144 Hz. These operations by the control section 11 will be described later.

The storage section 12 includes a disk device such as a solid state drive (SSD) or a hard disk drive (HDD) and a memory device and retains programs to be executed by the control section 11. Moreover, the storage section 12 operates also as a work memory for the control section 11. The programs (system program and application program) stored in the storage section 12 may be programs that have been provided in such a manner as to be stored in a computer-readable non-transitory recording medium and been copied into the storage section 12.

The operation section 13 accepts an operation input by a user, from an input device, and outputs the operation input to the control section 11. This input device can be a mouse, a keyboard, or the like when the information processing device 1 is a personal computer. Further, this input device can be a game controller or the like when the information processing device 1 is a home-use game console.

The display output section 14 generates a signal of video representing a frame input from the control section 11 and outputs the signal to the display monitor 2 at an ordered timing (update timing) in accordance with an instruction input from the control section 11.

The display monitor 2 receives an input of the signal of video of one frame from the information processing device 1 and displays the video at a predetermined timing. This timing is a timing at a certain cycle in a case in which the display monitor 2 is not compatible with the variable refresh rate. Moreover, this timing is basically a timing specified by the information processing device 1 in a case in which the display monitor 2 is compatible with the variable refresh rate. The operation of the display monitor 2 is widely known, and therefore, detailed description here is omitted.

Note that, in response to a demand input from the information processing device 1, the display monitor 2 outputs, to the information processing device 1, functional information representing functions of the display monitor 2, such as whether or not the display monitor 2 is compatible with the variable refresh rate, information regarding the variable range in the case in which the display monitor 2 is compatible with the variable refresh rate, and whether or not the display monitor 2 is a limited display monitor involving a limit on change in the variable refresh rate.

Next, the operation of the control section 11 of the information processing device 1 of the present embodiment will be described. In the present embodiment, the control section 11 implements a configuration functionally including a setting accepting section 21, an execution managing section 22, and a display control section 23 as exemplified in FIG. 2, by executing the system program stored in the storage section 12.

Figure 2:
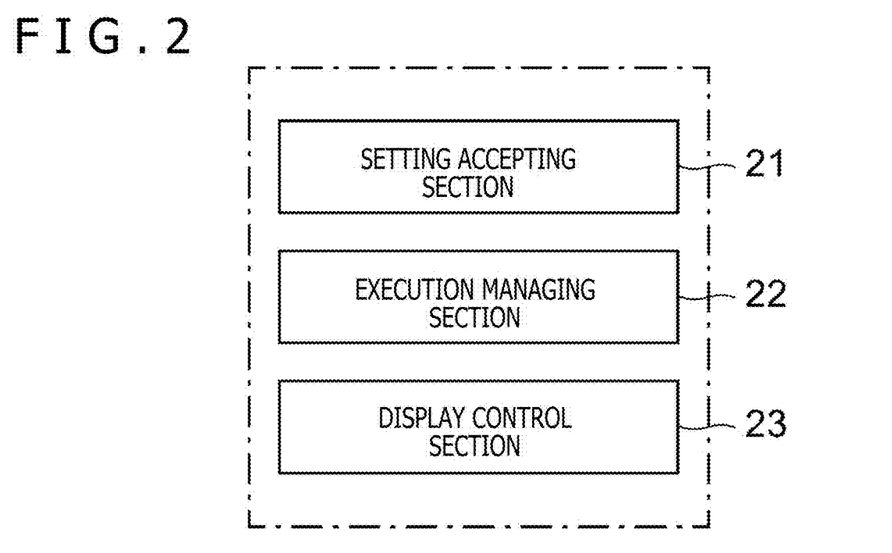
FIG. 2 is a functional block diagram representing an example of the information processing device according to the embodiment of the present invention.

The setting accepting section 21 accepts, from the user, a setting of a function of a display monitor as the target of emulation. As one example, the setting accepting section 21 presents, to the user, options of the function of the display monitor that can be emulated. The user sets the function of the display monitor as the target of the emulation by selecting the function from the presented options.

At this time, the setting accepting section 21 may acquire information representing the functions of the display monitor 2 actually connected and present options of the function that can be emulated, on the basis of the acquired information.

In this example, the setting accepting section 21 accepts, from the display monitor 2, a lower-limit value Rmin and an upper-limit value Rmax of the refresh rate when the display monitor 2 operates at the variable refresh rate, as information regarding the range of the variable refresh rate with which the display monitor 2 is compatible. Further, the setting accepting section 21 accepts, from the display monitor 2, information indicating whether or not the display monitor 2 is a limited display monitor involving a limit on the rate of variation in the variable refresh rate between frames (whether or not there is a limit). Moreover, the setting accepting section 21 may acquire, from the display monitor 2, information regarding other functions such as the value of the refresh rate (RB) when the display monitor 2 operates at a fixed refresh rate, for example.

The setting accepting section 21 presents options of the range (lower-limit value and upper-limit value) of the refresh rate of the display monitor as the target of the emulation in the above-described acquired range of the variable refresh rate with which the display monitor 2 is compatible, and causes the user to input the range. Specifically, in a case in which the lower-limit value of the range of the variable refresh rate with which the display monitor 2 is compatible is "1 Hz" and the upper-limit value is "200 Hz," the setting accepting section 21 presents options of "1 Hz," "30 Hz," "48 Hz," . . . as the lower-limit value to be set. Further, the setting accepting section 21 presents options of values equal to or lower than "200 Hz," such as "60 Hz," "80 Hz," "100 Hz," "120 Hz," "144 Hz," "165 Hz," . . . as the upper-limit value.

Moreover, in a case in which the lower-limit value of the range of the variable refresh rate with which the display monitor 2 is compatible is "30 Hz," the setting accepting section 21 excludes values lower than "30 Hz" as the lower-limit value and presents options of "30 Hz," "48 Hz," . . . as the lower-limit value to be set.

The user selects the upper-limit value and the lower-limit value of the variable range of the variable refresh rate of the display monitor as the target of the emulation from the options presented in this manner, and inputs an emulation setting.

Further, the setting accepting section 21 uses the information that is acquired from the above-described display monitor 2 and that indicates whether or not there is a limit. When the acquired information indicates that the display monitor 2 is not a limited display monitor, the setting accepting section 21 presents, to the user, an option that causes the user to select whether or not to emulate a limited display monitor. Moreover, when the acquired information indicates that the display monitor 2 is a limited display monitor, the setting accepting section 21 does not present the option that causes the user to select whether or not to emulate a limited display monitor.

Note that, although selection by the user is demanded by presentation of options here, this example is one example, and the setting accepting section 21 may accept, from the user, an input of the upper-limit value and the lower-limit value of the variable refresh rate of the display monitor 2 as the target of the emulation, an input of information indicating whether or not to emulate a limited display monitor, and the like. In this case, in a case in which emulation corresponding to the input value or setting is not possible, on the basis of information regarding functions acquired from the display monitor 2 actually connected, the setting accepting section 21 may notify the user to that effect and demand correction of the input.

For example, when the user has made a setting to emulate a display monitor that is not limited in a case in which the information acquired from the display monitor 2 indicates that the display monitor 2 is a limited display monitor, the setting accepting section 21 notifies the user that it is impossible to execute the emulation corresponding to this setting, and demands correction of the setting.

The execution managing section 22 manages execution of the application program. Specifically, the execution managing section 22 executes process management processing regarding activation, stop, and the like of the application program specified through receiving an instruction from the user. Further, the execution managing section 22 executes processing of memory management, such as ensuring the memory necessary for execution of the application program.

The display control section 23 executes a display output of an image rendered through execution of the application program by the control section 11 to the display monitor 2 actually connected. At this time, the display control section 23 executes the display output in such a manner as to emulate the state in which a display monitor with the function represented by the emulation setting accepted by the setting accepting section 21 is virtually connected.

Specifically, if the emulation setting accepted by the setting accepting section 21 from the user includes such conditions as
  the lower limit of the variable refresh rate is "48 Hz" and the upper limit is "120 Hz" and
  the display monitor is a limited display monitor and needs to be controlled in such a manner that the absolute value of the difference in the refresh rate between frames does not exceed $\Delta Rlimit$ (specific value is settled in advance),
the display control section 23 operates as in the following example.

At the time of execution of the application program, upon obtaining the value (target value) of the refresh rate demanded in processing thereof, the display control section 23 executes the following target value setting processing.

In this target value setting processing, the display control section 23 compares the target value with the lower-limit value and the upper-limit value of the variable refresh rate indicated by the emulation setting. Here, in a case in which a target value Rtarget is not between the lower-limit value Rmin and the upper-limit value Rmax of the variable refresh rate indicated by the emulation setting, for example, in the case of Rtarget>Rmax, the display control section 23 executes processing defined in the system program in advance as processing executed in a case in which the target value departs from the limit based on the function of the display monitor. As one example, the display control section 23 sets Rtarget=Rmax to continue the processing, and notifies the application program side of this setting (setting change notification).

Note that the display control section 23 continues the processing without any change when the target value Rtarget is between the lower-limit value Rmin and the upper-limit value Rmax of the variable refresh rate indicated by the emulation setting.

Then, the display control section 23 obtains an absolute value $\Delta R$ of the difference between a current refresh rate Rcurrent and the target value Rtarget (in a case in which the target value Rtarget has been reset to Rmax, the value of Rmax), i.e., $\Delta R=|Rtarget-Rcurrent|$ (here, $|x|$ means the absolute value of x), and examines whether or not this absolute value $\Delta R$ exceeds $\Delta Rlimit$ that is the limit defined in the emulation setting.

In the case of $\Delta R > \Delta Rlimit$, the display control section 23 executes processing defined in the system program in advance as processing executed in the case of excess over the limit of the limited display monitor. For example, the display control section 23 sets the refresh rate of the next frame to Rtarget=Rcurrent+$\Delta Rlimit$ (in the case of Rtarget>Rcurrent) or Rtarget=Rcurrent−$\Delta Rlimit$ (in the case of Rtarget<Rcurrent) and ends the target value setting processing.

Moreover, the display control section 23 sets the refresh rate of the next frame to Rtarget and ends the target value setting processing if $\Delta R \leq \Delta Rlimit$ is satisfied when whether or not the absolute value $\Delta R$ exceeds $\Delta Rlimit$, which is the limit defined in the emulation setting, is examined.

The display control section 23 outputs Rtarget settled in the target value setting processing executed thus far to the display monitor 2 and thereafter completes rendering of a frame by processing of the application program. Thereupon, the display control section 23 outputs a signal of video of the rendered frame to the display monitor 2. Then, in a case in which a target value specified by the application program and Rtarget settled in the target value setting processing are different from each other, the display control section 23 sets Rtarget to the target value specified by the application program and executes the target value setting processing again.

Note that, if the target value specified by the application program and Rtarget settled in the target value setting processing are the same when the display control section 23 outputs the signal of the video of the frame to the display monitor 2, the display control section 23 repeats, from then on, processing of outputting a signal of video of a rendered frame to the display monitor 2 every time the rendering of the frame is completed by processing of the application program, until the target value is changed by the application program.

Moreover, in a case in which control with a fixed refresh rate is demanded by the application program, the display control section 23 emulates a state in which a display monitor with the fixed refresh rate is connected, if the value of the fixed refresh rate is set in the emulation setting accepted by the setting accepting section 21 from the user.

In the example here, the execution managing section 22 executes processing in accordance with what is defined by the application program as processing in a case in which the above-described setting change notification has been received. For example, in a case in which the application program does not execute processing corresponding to the setting change notification, some kind of result such as disturbance of the display is observed. Thus, a creator of the application program can come to know the necessity for correction.

[Operation]

The information processing device 1 of the present embodiment includes the above configuration and operates in the following manner. When receiving an instruction to execute emulation of a display monitor from a user, the information processing device 1 acquires, from the display monitor 2 connected, information representing the functions thereof and presents options of the function that can be emulated, on the basis of the acquired information.

In the following example, it is assumed that the lower-limit value of the range of the variable refresh rate with which the display monitor 2 actually connected to the information processing device 1 is compatible is "1 Hz" and the upper-limit value is "200 Hz." Further, it is assumed that the display monitor 2 does not involve a limit on the rate of variation in the variable refresh rate between frames (is not a limited display monitor).

Figure 3:
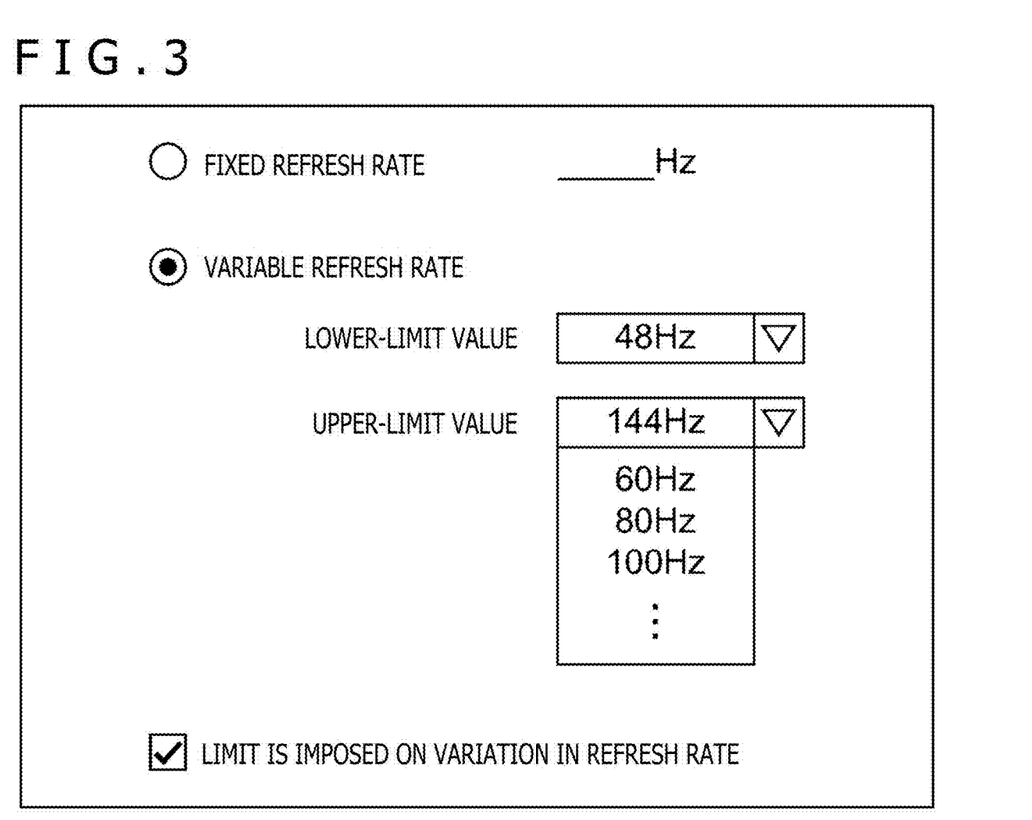
FIG. 3 is an explanatory diagram representing an example of a setting screen presented by the information processing device according to the embodiment of the present invention.

In order to cause the user to select the function of the display monitor that can be emulated by using the display monitor 2, the information processing device 1 displays a setting screen in such a manner that the lower-limit value of the variable refresh rate can be selected from any of "1 Hz," "30 Hz," "48 Hz," . . . to present options to the user (FIG. 3). Further, the upper-limit value of the variable refresh rate is displayed in such a manner as to be selectable from options of values equal to or lower than "200 Hz," such as "60 Hz," "80 Hz," "100 Hz," "120 Hz," "144 Hz," "165 Hz," . . . .

Moreover, the information processing device 1 displays an option to cause the user to select whether or not to emulate a limited display monitor in this setting screen.

The information processing device 1 operates in the following manner assuming that, in this setting screen, the user makes an emulation setting to emulate a display monitor that has, for example, "48 Hz" as the lower-limit value and "144 Hz" as the upper-limit value and is a limited display monitor involving a limit on the rate of variation in the variable refresh rate between frames.

The information processing device 1 activates an application program specified through receiving an instruction from the user. This application program sequentially renders a screen (frame) to be displayed.

Since the range of the variable refresh rate is set in the emulation setting, the information processing device 1 executes emulation of a state in which the display monitor with the set variable refresh rate with the lower-limit value Rmin="48 Hz" and the upper-limit value Rmax="144 Hz" is connected.

Further, since emulating the limited display monitor has been selected in the emulation setting, the information processing device 1 emulates a state in which the absolute value of the difference in the refresh rate between frames does not exceed the value ΔRlimit settled in advance.

Note that, although this value ΔRlimit is set in advance here, the user may set also this value as the emulation setting.

During processing of the application program, the information processing device 1 obtains the value (target value) Rtarget of the refresh rate demanded in processing of display by this application program and executes the target value setting processing. Note that the information processing device 1 stores the value of the target value demanded by the application program, as an original target value (Rdemand).

Figure 4:
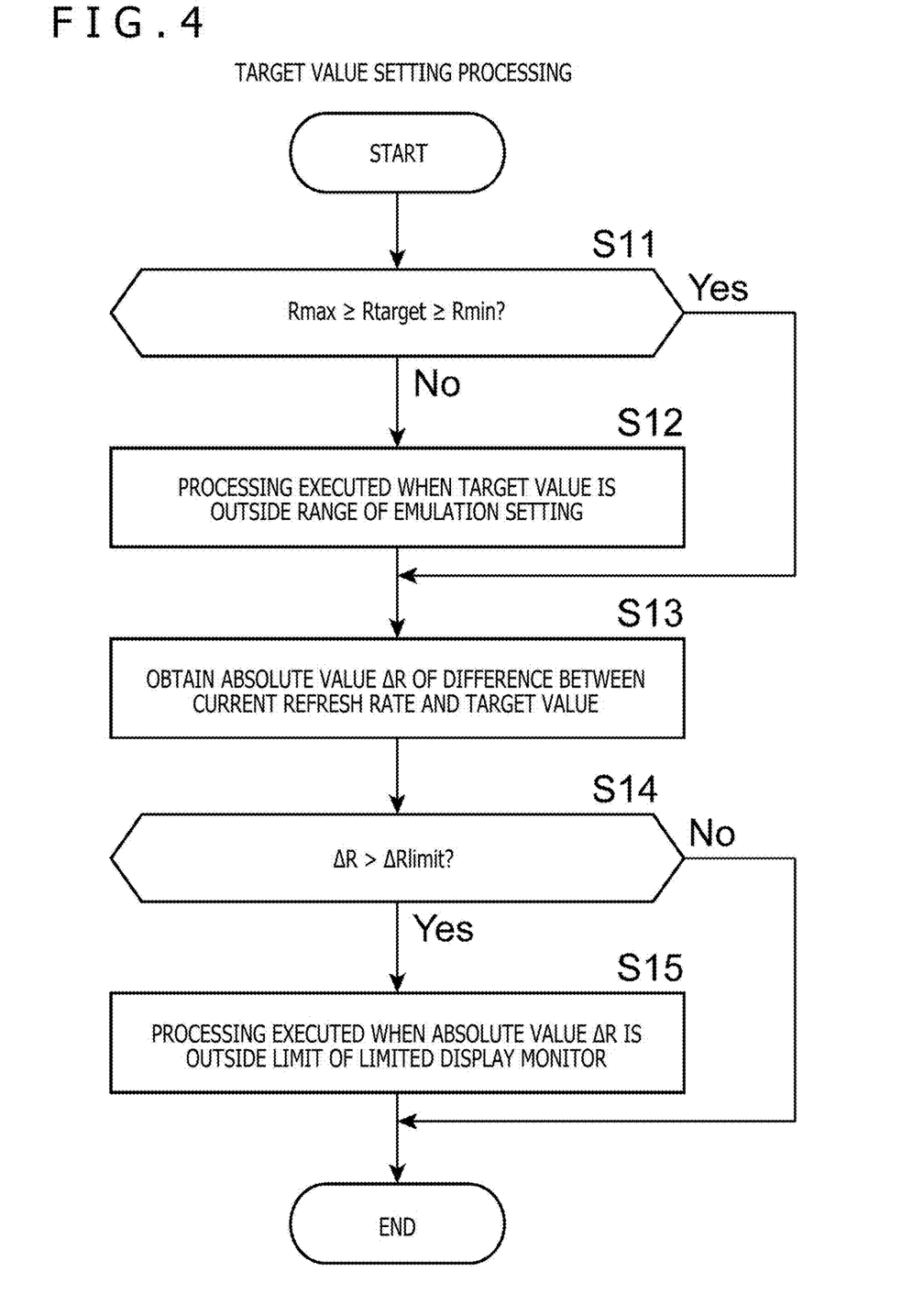
FIG. 4 is a flowchart representing an example of target setting processing performed by the information processing device according to the embodiment of the present invention.

Specifically, as exemplified in FIG. 4, the information processing device 1 determines whether or not the target value Rtarget demanded by the application program is between the lower-limit value Rmin and the upper-limit value Rmax of the variable refresh rate indicated by the emulation setting (whether or not Rmax≥Rtarget≥Rmin) (S11).

Here, in a case in which the target value Rtarget is not between the lower-limit value Rmin and the upper-limit value Rmax of the variable refresh rate indicated by the emulation setting (S11: No), the information processing device 1 executes processing defined in the system program in advance as processing executed in the case in which the target value departs from the limit based on the function of the display monitor (S12). For example, the information processing device 1 sets Rtarget=Rmax when Rtarget>Rmax or sets Rtarget=Rmin when Rtarget<Rmin to update the target value Rtarget. Then, the information processing device 1 executes processing of notifying the processing of the application program that the target value has been updated (setting change notification).

Note that the information processing device 1 skips the processing of step S12 when, in step S11, the target value Rtarget is between the lower-limit value Rmin and the upper-limit value Rmax of the variable refresh rate indicated by the emulation setting (S11: Yes).

Next, for the emulation of the limited display monitor, the information processing device 1 acquires the refresh rate Rcurrent used for the current frame display and obtains the absolute value ΔR=|Rtarget−Rcurrent| of the difference between this current refresh rate Rcurrent and the target value Rtarget (in a case in which the target value Rtarget has been reset in step S12, the value thereof) (S13).

Moreover, the information processing device 1 examines whether or not the absolute value ΔR obtained in step S13 exceeds ΔRlimit that is the limit defined in the emulation setting (S14).

When ΔR>ΔRlimit here (S14: Yes), the information processing device 1 executes processing defined in the system program in advance as processing executed in a case in which ΔR is over the limit of the limited display monitor (S15). For example, the information processing device 1 sets the refresh rate of the next frame to Rtarget=Rcurrent+ΔRlimit (in the case of Rtarget>Rcurrent) or Rtarget=Rcurrent−ΔRlimit (in the case of Rtarget<Rcurrent) to update the target value, and ends the target setting processing.

Further, when ΔR>ΔRlimit is not satisfied in step S14, the target setting processing is ended without any change.

The information processing device 1 outputs Rtarget settled in this target setting processing to the display monitor 2 and thereafter completes rendering of a frame by processing of the application program. Thereupon, the information processing device 1 outputs a signal of video of the rendered frame to the display monitor 2. Moreover, when the target value specified by the application program (value stored as Rdemand) and Rtarget settled in the target value setting processing are different from each other, the information processing device 1 resets Rtarget to the target value Rdemand specified by the application program and executes the target value setting processing again.

Note that, although, here, the information processing device 1 stores the target value specified by the application program as Rdemand and compares Rdemand with Rtarget settled in the target value setting processing, the present embodiment is not limited to this example and the information processing device 1 may operate as follows. Immediately before step S13 of the target setting processing, the information processing device 1 stores the target value at this timing as Rdemand and compares this stored value with Rtarget settled in the target value setting processing. In a case in which they are different from each other, the information processing device 1 resets Rtarget to satisfy Rtarget=Rdemand and repeats the processing from step S13.

If the target value specified by the application program (value stored as Rdemand) and Rtarget settled in the target value setting processing are the same when the information processing device 1 outputs a signal of video of a frame to the display monitor 2, the information processing device 1 repeats, from then on, processing of outputting a signal of video of a rendered frame to the display monitor 2 every time the rendering of the frame is completed by processing of the application program, until the target value is changed by the application program.

According to the present embodiment, an operation of a case in which a display monitor with various functions is connected can be emulated.

Further, for example, an operation based on the application program in a case in which a refresh rate different from the demanded refresh rate is used is emulated owing to the above-described target setting processing. Therefore, the present embodiment can contribute to a purpose such as debugging.

REFERENCE SIGNS LIST

1: Information processing device
2: Display monitor
11: Control section
12: Storage section
13: Operation section
14: Display output section
21: Setting accepting section
22: Execution managing section
23: Display control section

The invention claimed is:

1. An information processing device comprising:
processing circuitry configured to:
  accept an input of an emulation setting relating to a function of a display monitor as a target of emulation, the emulation setting comprising a variable range including a lower-limit value and an upper-limit value of a variable refresh rate during implementation of the emulation on the display monitor;
  manage execution of an application program; and
  execute a display output of an image rendered by executing the application program on the display monitor, in such a manner as to emulate a state in which the emulation is implemented as a virtual display monitor with a function represented by the accepted emulation setting on the display monitor.

2. The information processing device according to claim 1, wherein the processing circuitry is further configured to accept the emulation setting by acquiring information representing a function of the display monitor connected to the information processing device;
present options of emulation that are allowed to be virtually set, on a basis of the acquired information; and
cause the presented options to be selected.

3. The information processing device according to claim 1, wherein the emulation setting includes
whether or not to limit variation of the variable refresh rate of each frame.

4. The information processing device according to claim 1, wherein the processing circuitry is further configured to
obtain a target value of a refresh rate demanded by the application program,
determine whether the target value is between the lower-limit value and the upper-limit value of the variable refresh rate indicated by the emulation setting, and
execute processing defined in a system program when the target value is not between the lower-limit value and the upper-limit value.

5. The information processing device according to claim 4, wherein the processing circuitry is further configured to
set the target value to the upper-limit value when the target value exceeds the upper-limit value,
set the target value to the lower-limit value when the target value is below the lower-limit value, and
notify the application program of the emulation setting change.

6. The information processing device according to claim 1, wherein the processing circuitry is further configured to
obtain an absolute value of a difference between a current refresh rate and a target refresh rate,
determine whether the absolute value exceeds a predetermined limit defined in the emulation setting, and
adjust the target refresh rate when the absolute value exceeds the predetermined limit.

7. The information processing device according to claim 6, wherein the processing circuitry is further configured to
set the target refresh rate to a sum of the current refresh rate and the predetermined limit when the target refresh rate is greater than the current refresh rate.

8. The information processing device according to claim 6, wherein the processing circuitry is further configured to
set the target refresh rate to a difference between the current refresh rate and the predetermined limit when the target refresh rate is less than the current refresh rate.

9. The information processing device according to claim 1, wherein the processing circuitry is further configured to
output a settled target refresh rate to the display monitor,
complete rendering of a frame by processing of the application program,
output a signal of video of the rendered frame to the display monitor, and
repeat a target value setting processing when a target value specified by the application program and the settled target refresh rate are different.

10. The information processing device according to claim 1, wherein the processing circuitry is further configured to
acquire a lower-limit value and an upper-limit value of a variable refresh rate range from the display monitor,
present options for selecting the lower-limit value and the upper-limit value of the variable refresh rate for the emulation within the acquired range, and
accept user input for selecting the lower-limit value and the upper-limit value for the emulation setting.

11. The information processing device according to claim 1, wherein the processing circuitry is further configured to
- acquire information indicating whether the display monitor physically connected is a limited display monitor involving a limit on a rate of variation in the variable refresh rate between frames,
- present an option for selecting whether to emulate a limited display monitor when the acquired information indicates that the display monitor physically connected is not a limited display monitor, and
- accept user input for selecting whether to emulate a limited display monitor.

12. A control method of an information processing device in which the information processing device including a processor is used, the method comprising:
by the processor,
- accepting an input of an emulation setting relating to a function of a display monitor as a target of emulation, the emulation setting comprising a variable range including a lower-limit value and an upper-limit value of a variable refresh rate during implementation of the emulation on the display monitor;
- managing execution of an application program; and
- executing a display output of an image rendered by executing the application program on the display monitor, in such a manner as to emulate a state in which the emulation is implemented as a virtual a display monitor with a function represented by the accepted emulation setting on the display monitor.

13. The control method of claim 12, further comprising:
- obtaining a target value of a refresh rate demanded by the application program;
- determining whether the target value is between a lower-limit value and an upper-limit value of a variable refresh rate indicated by the emulation setting; and
- executing processing defined in a system program when the target value is not between the lower-limit value and the upper-limit value.

14. The control method of claim 13, further comprising:
- setting the target value to the upper-limit value when the target value exceeds the upper-limit value;
- setting the target value to the lower-limit value when the target value is below the lower-limit value; and
- notifying the application program of the emulation setting change.

15. The control method of claim 12, further comprising:
- obtaining an absolute value of a difference between a current refresh rate and a target refresh rate;
- determining whether the absolute value exceeds a predetermined limit defined in the emulation setting; and
- adjusting the target refresh rate when the absolute value exceeds the predetermined limit.

16. The control method of claim 15, further comprising:
- setting the target refresh rate to a sum of the current refresh rate and the predetermined limit when the target refresh rate is greater than the current refresh rate.

17. The control method of claim 15, further comprising:
- set the target refresh rate to a difference between the current refresh rate and the predetermined limit when the target refresh rate is less than the current refresh rate.

18. A non-transitory computer-readable recording medium that stores a program for a computer thereon which, when executed by the computer causes the computer to perform a method comprising:
- accepting an input of an emulation setting relating to a function of a display monitor as a target of emulation, the emulation setting comprising a variable range including a lower-limit value and an upper-limit value of a variable refresh rate during implementation of the emulation on the display monitor;
- managing execution of an application program; and
- executing a display output of an image rendered by executing the application program on the display monitor, in such a manner as to emulate a state in which the emulation is implemented as a virtual a display monitor with a function represented by the accepted emulation setting on the display monitor.

* * * * *